United States Patent [19]
Lauritzen et al.

[11] Patent Number: 5,395,133
[45] Date of Patent: Mar. 7, 1995

[54] AIR BAG REACTION CANISTER HAVING SOFTENED EDGES

[75] Inventors: Donald R. Lauritzen, Hyrum; Larry D. Rose, Layton, both of Utah

[73] Assignee: Morton International, Inc., Chicago, Ill.

[21] Appl. No.: 192,211

[22] Filed: Feb. 4, 1994

[51] Int. Cl.⁶ .............................................. B60R 21/20
[52] U.S. Cl. ...................................... 280/732; 280/752
[58] Field of Search ............... 280/728 A, 732, 728 B, 280/728 R, 751, 752, 731, 730 R

[56] References Cited

U.S. PATENT DOCUMENTS

| | | | |
|---|---|---|---|
| 3,708,179 | 1/1973 | Hutten | 280/732 |
| 4,111,457 | 9/1978 | Kob et al. | 280/728 A |
| 4,703,669 | 11/1987 | Hyodo | 74/492 |
| 4,810,005 | 3/1989 | Fohl | 280/732 |
| 4,941,678 | 7/1990 | Lauritzen et al. | 280/732 |
| 4,943,027 | 7/1990 | Nakayama | 248/548 |
| 4,964,654 | 10/1990 | Bishop | 280/743 |
| 5,044,663 | 9/1991 | Seizert | 280/730 |
| 5,062,664 | 11/1991 | Bishop et al. | 280/743 |
| 5,195,776 | 3/1993 | Sakakida et al. | 280/732 |
| 5,209,510 | 5/1993 | Mamiya | 280/732 |
| 5,209,519 | 5/1993 | Shiga et al. | 280/728 A |
| 5,222,760 | 6/1993 | Rafferty | 280/728 B |
| 5,342,082 | 8/1994 | Kriska et al. | 280/728 A |

FOREIGN PATENT DOCUMENTS

| | | | |
|---|---|---|---|
| 3934588 | 4/1991 | Germany | 280/751 |
| 0155855 | 6/1990 | Japan | 280/728 A |
| 2306846 | 12/1990 | Japan | 280/728 A |
| 4303050 | 10/1992 | Japan | 280/728 A |
| 5185898 | 7/1993 | Japan | 280/752 |
| 1053360 | 12/1966 | United Kingdom | 280/751 |

Primary Examiner—Karin L. Tyson
Assistant Examiner—Peter C. English
Attorney, Agent, or Firm—Nick C. Kottis; Gerald K. White

[57] ABSTRACT

A reaction canister for a vehicle passive restraint system has a resilient, impact energy absorbing element joined adjacent the edge of its wall which is adjacent an automotive panel likely to be impacted by an occupant in the event of a low speed collision. The resulting softening serves to avoid injury to the occupant as a result of contact with the panel.

21 Claims, 7 Drawing Sheets

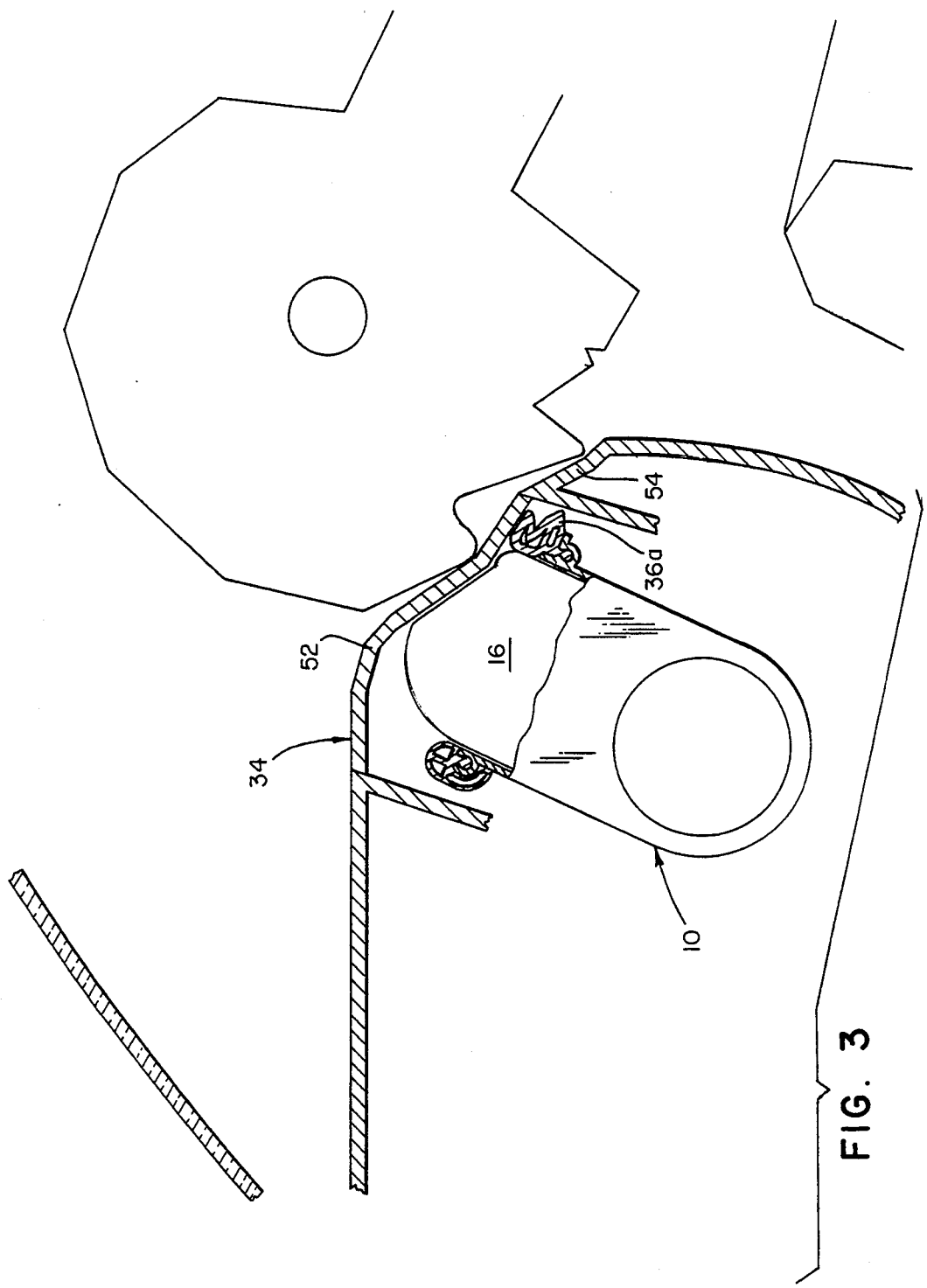

AIR BAG REACTION CANISTER HAVING SOFTENED EDGES

BACKGROUND OF THE INVENTION

This invention relates generally to inflatable passive restraint systems for use in vehicles for restraining the movement of a seated occupant during a collision and, more particularly, to an improvement in the structure such as used for housing and positioning a gas generator and inflatable bag in the vehicle.

The value of safety restraint systems which self-actuate from an undeployed to a deployed state without the need for intervention by the operator, i.e., "passive restraint systems", and particularly those restraint systems incorporating inflatable bags or cushions has gained general appreciation.

It is well known to protect a vehicle occupant using a cushion or bag that is inflated with gas, e.g., an "air bag" when the vehicle encounters sudden deceleration, such as in a collision. During deployment, the rapidly evolving gas with which the bag is typically filled is an inert gas, e.g., nitrogen. In such systems, the cushion is normally housed in an uninflated and folded condition to minimize space requirements.

Vehicular inflatable restraint systems generally include multiple crash sensors generally positioned about or mounted to the frame and/or body of the subject vehicle and serve to sense sudden decelerations by the vehicle. In turn, the sensor sends a signal to an inflatable bag module/assembly strategically positioned within the riding compartment of the vehicle to actuate deployment of the air bag. In general, an inflatable bag provided for the protection of a vehicle driver, i.e., a driver side air bag, is mounted in a storage compartment located in the steering column of the vehicle. Whereas, an inflatable bag for the protection of a front seat passenger, i.e., a passenger side air bag, is typically mounted in the instrument panel/dash board of the vehicle.

Typical inflatable passive restraint systems for the passenger side make use of an air bag module which generally includes an outer reaction housing or canister. The reaction canister generally serves to support or contain other components of the air bag module, including what is referred to as an "air bag inflator" or, more briefly, as an "inflator." The inflator, upon actuation, acts to provide the gas to inflate the bag.

Such a reaction canister is commonly formed of a trough-shaped body part which may be extruded and cut to a desired length. Such a body part typically includes a pair of opposed side walls the ends of which are typically closed by end plate walls such as of flat aluminum sheets or having an extruded form. An example of a reaction canister in accordance with the prior art will be found in commonly assigned U.S. Pat. No. 4,941,678 of Lauritzen, et al.

As described above, the reaction canister of the restraint system is commonly positioned behind the instrument panel of a vehicle. With a so positioned reaction canister, the edges of the reaction canister may be within one inch or less of the back surface of the instrument panel. As a result, such as in the event of a low speed collision without deployment of the air bag, for example, the head or other part of the body of a vehicle occupant may make impact with the instrument panel and force the instrument panel against the relatively rigid edge of the typical reaction canister, with the force of such contact being transmitted to the occupant. In turn, such contact can result in injury to the vehicle occupant. In view thereof, the National Highway Safety Administration has imposed standards relating to vehicle occupant impact with vehicle instrument panels.

One approach to solving this problem has been to add flanges or rounded edges to the otherwise open edges of the reaction canister. This has helped to a degree but the reaction canister still remains very stiff and rigid.

Another approach has been to add a pattern of slots in the trough-like sidewall and in the associated end panels. While such an approach can help to soften the edges of the reaction canister it can also result in weakening the reaction canister. In turn, a weakened reaction canister can be more susceptible to deformation upon air bag inflation, commonly referred to as "bell-mouthing". In addition, the inclusion of such slots in the side or end walls of a reaction canister can create potential snag points upon which the stored or deploying air bag may undesirably snag, which can detrimentally effect performance of the restraint system.

Another approach has been to simply cut down the reaction canister, e.g., the sidewalls and end plates, thereby leaving the folded up air bag exposed to serve as an impact cushion even in an undeployed state. Such an approach suffers, however, as cut down reaction canisters generally leave the air bag unsupported and unprotected and thus more susceptible to damage.

Consequently, the need remains for an improved reaction canister having softened edges which yield to direct impact but appropriately resist lateral displacement.

SUMMARY OF THE INVENTION

A general object of the invention is to provide an improved reaction canister having softened edges which yield to direct impact but appropriately resist lateral displacement.

A more specific objective of the invention is to overcome one or more of the problems described above.

The general object of the invention can be attained, at least in part, through a resilient, impact energy absorbing element joined adjacent to an edge of a reaction canister side wall, in order to soften the edge which is behind and adjacent the instrument panel of the vehicle. The element is deformable upon impact by forced displacement of the panel to absorb impact energy transmitted thereto.

The prior art fails to provide a simple and efficient solution to the standards imposed by the National Highway Safety Administration regarding the interiors of automotive vehicles and the desire to soften the edges of a reaction canister placed behind and adjacent automotive panels and which panels may be impacted by occupants in the event of a low speed collision.

The invention further comprehends an improved automotive air bag reaction canister for housing and positioning an air bag inflator and inflatable air bag of a passive restraint system. The reaction canister includes a trough-shaped body part having first and second side walls each having an edge and an end plate mounted to each end of the side walls to form a housing for at least an inflator. As the canister is typically installed behind and adjacent to an automotive panel, an edge of at least one of the side walls is softened by means of inclusion of an element formed of resilient, impact energy absorbing material joined adjacent to the panel adjacent edge of the canister whereby impact energy resulting from a low speed frontal collision of the automotive vehicle and imparted to the automotive panel in the head impact region is absorbed.

In one embodiment, the element formed of resilient, impact energy absorbing material includes first and second walls with at least the first wall extending the height of the air bag chute. The first and second walls are joined together by means of at least one truss member, with the truss member forming at least one hollow in the element to enhance the energy absorption capacity thereof.

Other objects and advantages will be apparent to those skilled in the art from the following detailed description taken in conjunction with the appended claims and drawings.

BRIEF DESCRIPTION OF THE DRAWINGS

FIG. 3 is a simplified enlarged fragmentary side view of the vehicle interior of FIG. 2 at the time of contact of the automotive panel by the head of the vehicle occupant.

The drawings have been simplified to facilitate illustration and comprehension of the subject invention, for example, by not showing items such as screw fasteners, such as can be used to join end plate walls to the described reaction canister body part, as the use of such conventional items for part attachment is well known and do not form a part of the invention.

DETAILED DESCRIPTION OF THE INVENTION

The present invention provides a reaction canister for housing and positioning an air bag inflator and an inflatable air bag of a passive restraint system. In order to soften at least one edge of the reaction canister which edge is adjacent to the vehicle's instrument panel, such edge includes a resilient, impact energy absorbing element joined thereto.

Figure 1:
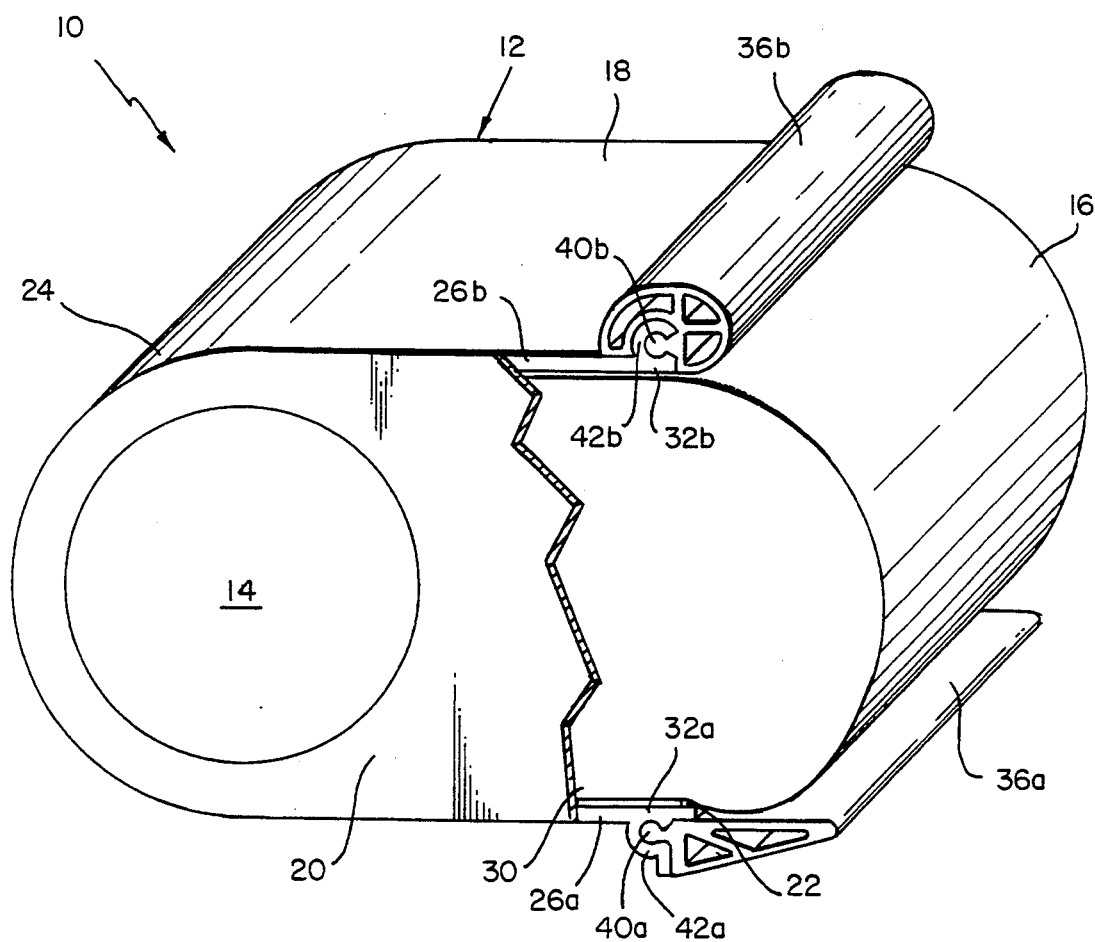
FIG. 1 is a simplified fragmentary perspective side view of an air bag module having a reaction canister in accordance with one embodiment of the invention.

FIG. 1 illustrates an air bag module, generally designated by the reference numeral 10, having a reaction canister 12 in accordance with one embodiment of the invention. The air bag module 10 also includes an air bag inflator 14 and a folded, stored air bag, referred to hereinafter as an air bag pack 16.

The reaction canister 12 includes an elongated trough-shaped body part 18 and end plates 20 forming a reaction canister mouth, generally shown as reference numeral 22. In FIG. 1, only one end plate can be seen. The body part 18 is a long narrow receptacle having a rounded bottom wall 24 and opposite side walls 26a and 26b. The side walls 26a and 26b serve to form an air bag chute 30 to house the air bag pack 16 and to guide the air bag upon deployment thereof. The end plates 20 are joined to the body part 18 such as by screw attachment (not shown), such as in a manner known in the art.

In this illustrated embodiment, the body part 18 has been extruded fabricated. It will be appreciated, however, that the resilient, impact energy absorbing element of the invention can, if desired, be used with an alternatively fabricated reaction canister such as a reaction canister formed of appropriate sheet metal.

Figure 2:
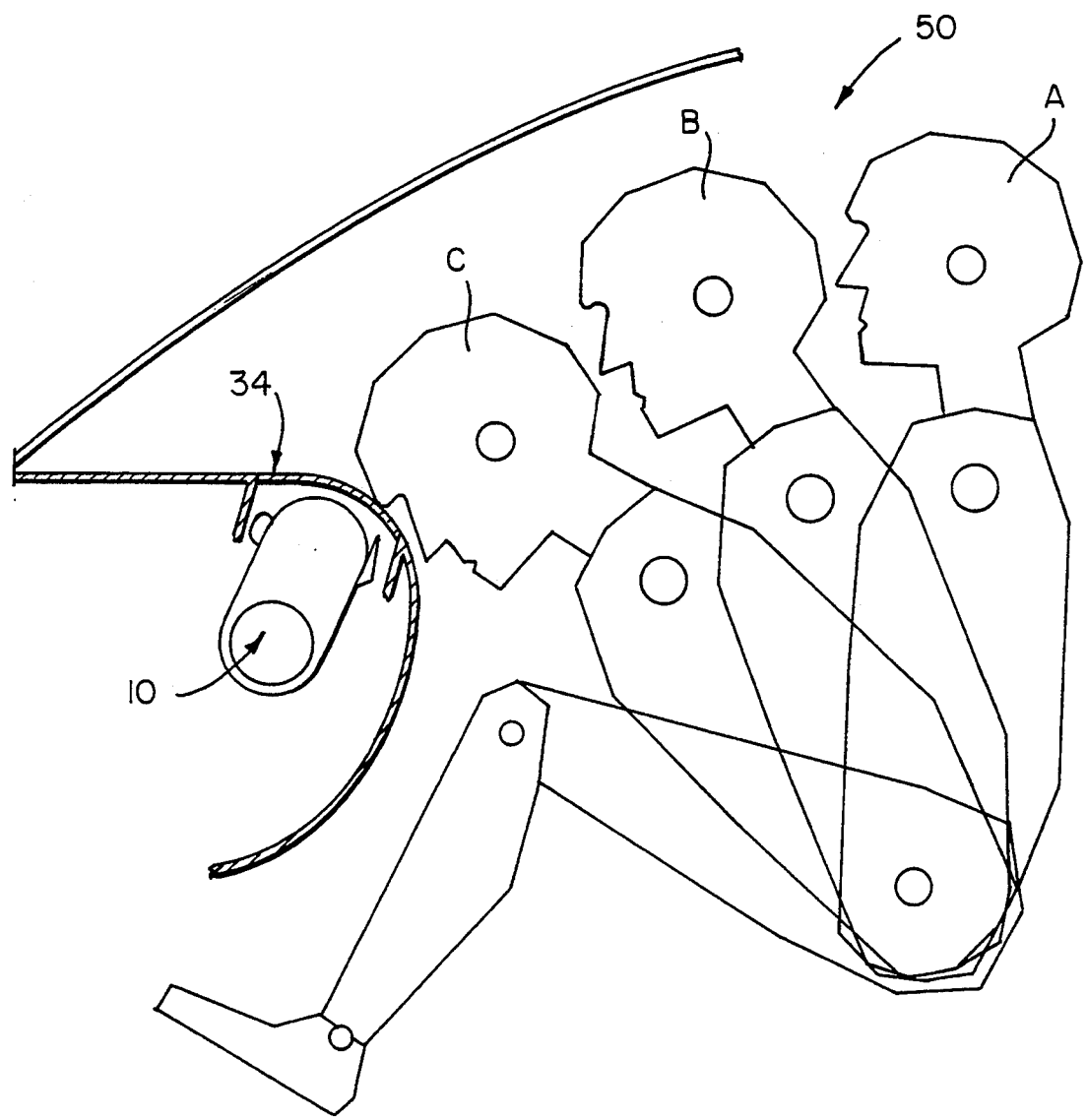
FIG. 2 is a simplified fragmentary side view of a vehicle interior wherein the air bag module of FIG. 1 has been positioned.

The reaction canister 12 is installed in such a manner that an edge 32a and 32b, respectively, of the side walls 26a and 26b lies behind and adjacent an automotive panel, e.g., an instrument panel 34 (see FIGS. 2 and 3). Accordingly, joined to each of the side walls 26a and 26b are first and second resilient, impact energy absorbing elements 36a and 36b, respectively, such as formed of one or more: a) elastomeric materials including, for example, natural rubber, synthetic rubbers, polyurethane, and thermoplastic polyolefin rubber (TPO rubber), b) thermoplastic materials, such as polypropylene, nylon, polycarbonate, or ABS, for example, or c) structural foams, such as urethane foam, for example.

Each of the impact energy absorbing elements 36a and 36b includes a protrusion 40a and 40b, respectively, which serves as a male form attachment insert for joining the elements 36a and 36b with the side walls 26a and 26b, respectively. To that end, each of the side wall edges 32a and 32b includes a coupling sleeve 42a and 42b, respectively, which serves as a female form connector adapted for mating connection with corresponding male form attachment insert, e.g., the protrusions 40a and 40b, respectively, whereby each of the protrusions 40a and 40b is inserted, such as by sliding, into the corresponding coupling sleeve 42a and 42b, respectively.

In accordance with one preferred embodiment of the invention, as the body part has been preferably extruded fabricated, such a coupling sleeve can advantageously be formed at the side wall edges as a part of the extrusion process. Also, the joining of the resilient, impact energy absorbing element of the invention to the side wall, as described, avoids the use of fasteners such as screws, rivets, bolts, etc. and the problems attendant such use. For example, the use of such fasteners typically requires that the user ensure proper tightening, alignment, and placement of the fastener. Thus, the use of such can increase the time and cost associated with corresponding manufacturing processes. However, it is also to be appreciated that the resilient, impact energy absorbing element of the invention can, if desired, be joined to appropriate reaction canister components by means of such fasteners, either alone or in conjunction with appropriate male and female form connectors.

FIG. 2 illustrates a vehicle interior 50 wherein the air bag module 10 of FIG. 1 has been positioned. FIG. 2 also illustrates the positioning, at various stages during a collision, of a vehicle occupant. The occupant is shown at A in a normal riding position, at B at a point during the deceleration, and at C at a point just prior to the head of the occupant contacting the instrument panel 34 having the air bag module 10 installed therebehind.

FIG. 3 is an enlarged fragmentary side view of the vehicle interior of FIG. 2 showing the head of the occupant contacting the automotive panel 34. As shown, the automotive panel 34 undergoes deformation both in the air bag module door portion 52 of the automotive panel 34 as well as in an area 54 adjacent thereto. As a result of the contact, the automotive panel 34 undergoes displacement causing the element 36a to deform.

In addition, a portion of the impact energy transmitted to the automotive panel 34 is transmitted to the air bag pack 16. As a result of absorption of impact energy by the automotive panel 34, the air bag pack 16, and the element 36a, injury to the occupant is avoided.

As shown in FIG. 3, of the side walls 26a and 26b, only the side wall 26a is within the head impact region of the instrument panel 34. Thus, the element 36b is not shown as being deformed as a result of the deformation of the panel 34. It will be appreciated, however, that an air bag module can be variously placed behind and adjacent an automotive panel. FIGS. 4A, 4B, 4C, and 4D illustrate a vehicle interior 60a, 60b, 60c and 60d, respectively, showing various alternative positionings of an air bag module 61a, 61b, 61c, and 61d, respectively, each having a reaction canister 62a, 62b, 62c, and 62d, respectively, behind and adjacent an automotive panel 64a, 64b, 64c, and 64d, respectively.

Figure 4A:
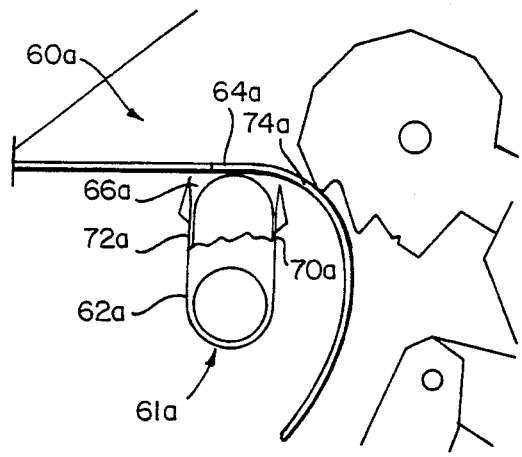
FIGS. 4A, 4B, 4C, and 4D are simplified fragmentary side views of a vehicle interior showing various alternative placements of a reaction canister in accordance with one embodiment of the invention.

In FIG. 4A, the air bag module 61a is placed such that the mouth 66a of the reaction canister 62a is directed upwards, behind and adjacent the automotive panel 64a. With such positioning, neither side wall edge 70a or 72a is within the head impact region 74a of the automotive panel 64a, i.e., that portion of the automotive panel which will undergo displacement upon head impact.

Figure 4B:
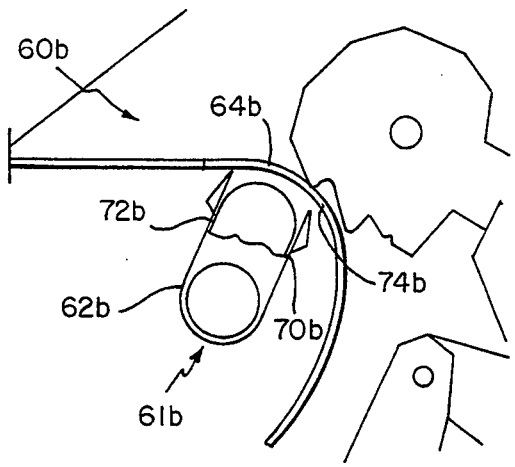

FIG. 4B illustrates placement of the air bag module 61b, such that lower side wall edge 70b is behind and adjacent the head impact region 74b of the automotive panel 64b while the upper side wall edge 72b is outside the head impact region 74b.

Figure 4C:
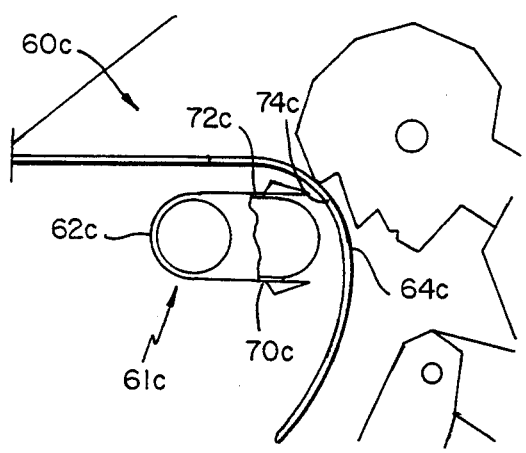

FIG. 4C illustrates placement of the air bag module 61c, such that upper side wall edge 72c is behind and adjacent the head impact region 74c of the automotive panel 64c while the lower side wall edge 70c is outside the head impact region 74c.

Figure 4D:
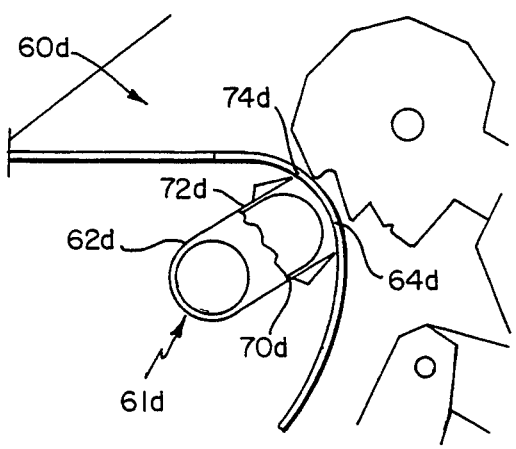

FIG. 4D illustrates placement of the air bag module 61d, such that both the lower and upper side wall edges 70d and 72d, respectively, are behind and adjacent the head impact region 74d of the automotive panel 64d.

As will be appreciated by one skilled in the art, the resilient, impact energy absorbing element of the invention can be of various forms, shapes, dimensions, and materials such to conform to the requirements of particular applications.

Figure 5A:
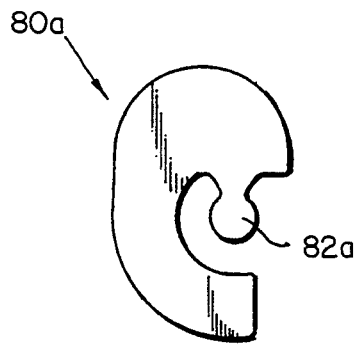
FIGS. 5A, 5B, 5C, 5D, 5E, and 5F are simplified side views of alternative embodiments of the resilient, impact energy absorbing element of the invention.
Figure 5D:
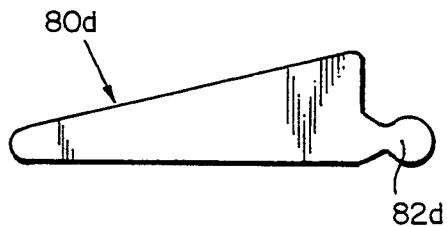
Figure 5B:
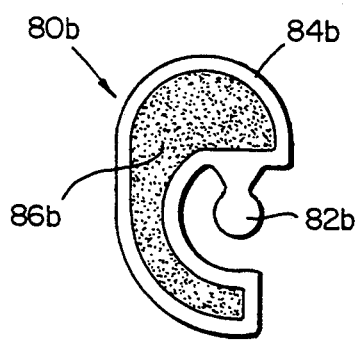
Figure 5E:
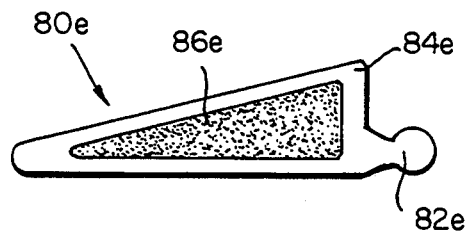
Figure 5C:
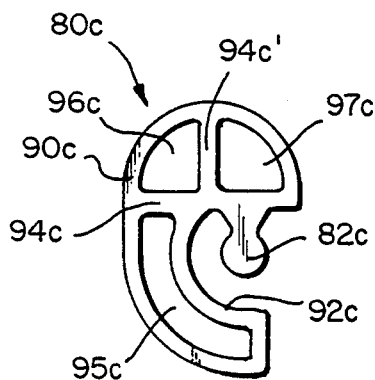
Figure 5F:
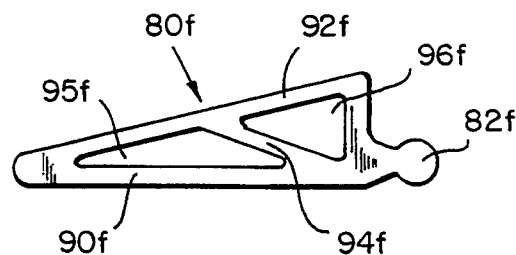

FIGS. 5A, 5B, 5C, 5D, 5E, and 5F illustrate preferred alternative embodiments of the resilient, impact energy absorbing element of the invention. More particularly, FIGS. 5A, 5B, and 5C illustrate elements 80a, 80b and 80c, having the a general shape of the letter "C" while FIGS. 5D, 5E, and 5F illustrate elements 80d, 80e, and 80f, in the general shape of a wedge. Each of the elements includes a protrusion 82(a–f), respectively, adapted for mating connection with a corresponding feature of the canister, in a manner such as described above. In addition, elements having a wedge or similar shape can advantageously be used to extend the height of an air bag chute formed by the reaction canister. Such an air bag chute is commonly used to house a stored air bag and guiding the air bag upon deployment.

FIGS. 5A and 5D illustrate elements 80a and 80d formed of a solid homogeneous material. Typically, such elements will be formed of a material such as an elastomer, thermoplastic, or structural foam, such as described above.

FIGS. 5B and 5E illustrate elements 80b and 80e formed to have an outer body 84b and 84e, respectively, of a first material and an inner body 86b and 86e, respectively, of a second material. Such embodiments of the elements of the invention permit the use of materials for the inner body which materials may not otherwise be able to tolerate the environment to which the elements are exposed and yet the use of which is desired as the material may have improved impact energy absorbing abilities, for example. For example, in such embodiments, the outer body will typically be formed of an elastomer or thermoplastic, such as described above, while the inner body can be formed of a material, such as a urethane foam, typically having a greater impact energy absorbing capacity than the material of the outer body.

FIGS. 5C and 5F illustrate elements 80c and 80f each having a first wall, 90c and 90f, respectively, and a second wall, 92c and 92f, respectively. The first and second walls are joined together by means of one or more truss members, e.g., truss members 94c and 94c' in the case of element 80c, and truss member 94f in the case of element 80f. Thus in element 80c hollows 95c, 96c and 97c are formed while in element 80f hollows 95f and 96f are formed. As will be appreciated, the inclusion of such hollows or voids within the walls of an element can enhance the energy absorption capacity thereof as well as desirably minimize the weight thereof. Of course, weight minimization is an important concern in improving the distance a vehicle can propel itself using a fixed quantity of fuel.

In practice, an impact energy absorbing element of the invention will, upon impact by forced displacement of the corresponding automotive panel, deform to absorb at least 5 millimeters of linear displacement. Furthermore, when an impact energy absorbing element of the invention is joined to a reaction canister in an area adjacent the head impact region of an automotive panel, such an element desirably will deform to absorb at least about 5 to 30 millimeters of linear displacement.

Figure 6:
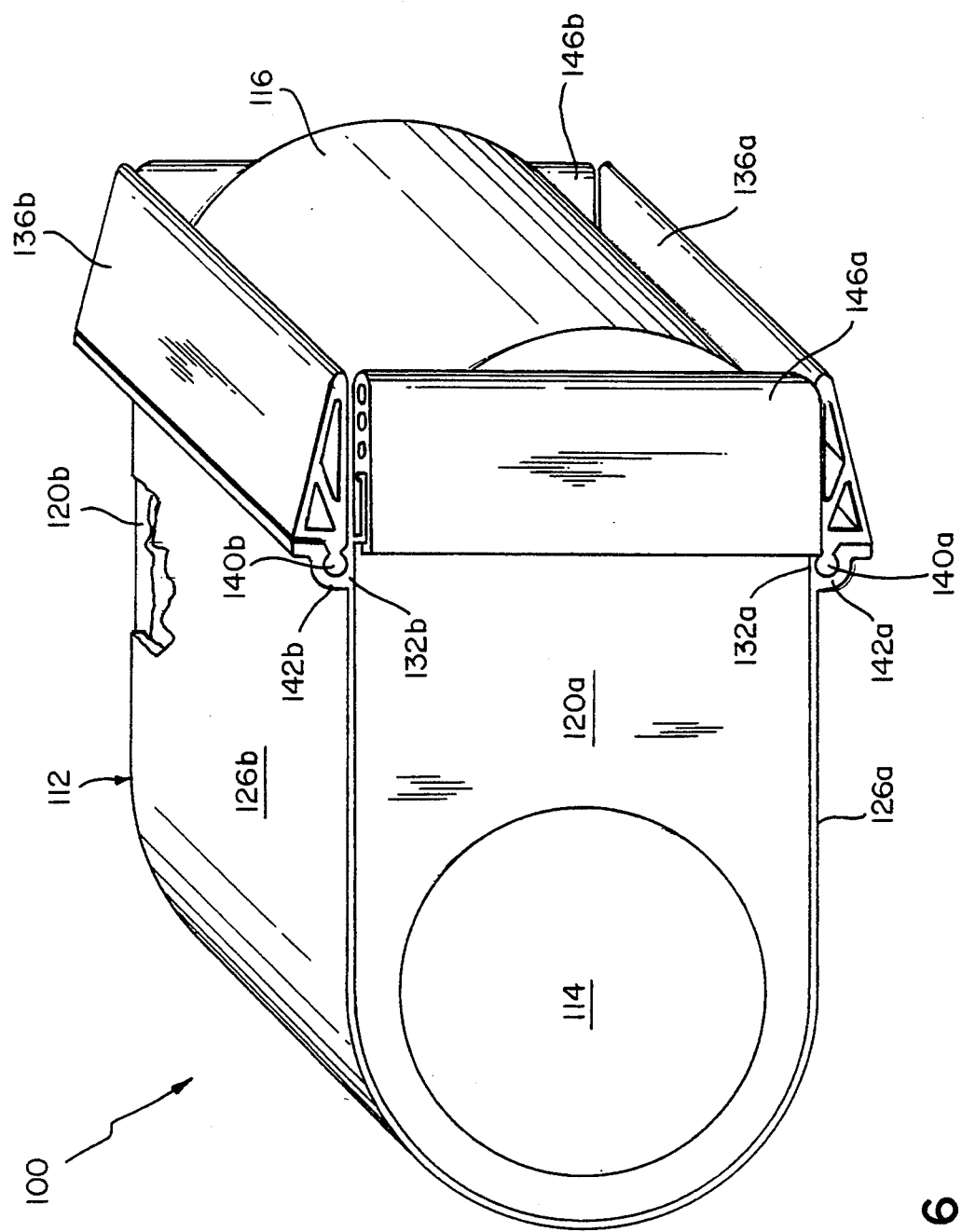
FIG. 6 is a simplified, fragmentary perspective side view of an air bag module having a reaction canister in accordance with an alternative embodiment of the invention.

While the invention has been described above with reference to the use of such impact energy absorbing elements along one or more of the side walls of a reaction canister, it will be appreciated that the invention is not so limited. Thus, such impact energy absorbing elements can be joined to other appropriate portions of the reaction canister, if desired. For example, FIG. 6 illustrates an embodiment of the invention similar to that illustrated in FIG. 1 in that air bag module, generally designated by the reference numeral 100, in addition to an air bag inflator 114 and an air bag pack 116 also includes a reaction canister 112 having resilient, impact energy absorbing elements 136a and 136b, respectively, joined to the edges 132a and 132b of the side walls 126a and 126b, respectively. As in FIG. 1, each of the impact energy absorbing elements 136a and 136b includes a protrusion 140a and 140b, respectively, which serves as a male form attachment insert for joining the elements 136a and 136b with the side wall edges 132a and 132b, respectively. To that end, each of the side wall edges 132a and 132b includes a coupling sleeve 142a and 142b, respectively, which serves as a female form connector adapted for mating connection with corresponding male form attachment insert, e.g., the corresponding protrusion 140a and 140b, respectively, whereby the protrusion is inserted, such as by sliding, into the sleeve.

Figure 7:
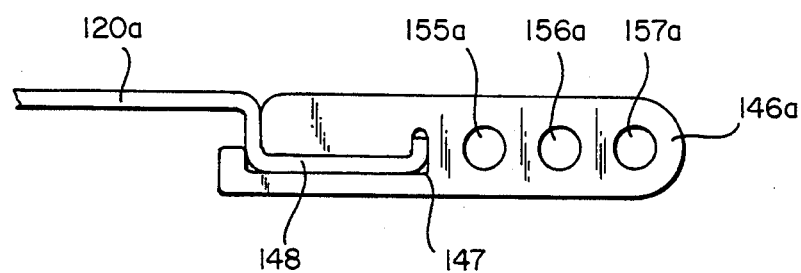
FIG. 7 is a simplified, fragmentary side view of a reaction canister wall having a resilient, impact energy absorbing element joined therewith in accordance with an alternative embodiment of the invention.

In the embodiment shown in FIG. 6, however, each of the end plate walls 120a and 120b, respectively, has joined therewith a corresponding resilient, impact energy absorbing element 146a and 146b, respectively. As perhaps can be better seen by reference to FIG. 7, the element 146a includes a channel 147 wherein an extending portion 148 of the end plate wall 120a is fitted, joining the element 146a to the end plate wall 120a. In this embodiment, in order to reduce weight and improve the deformability thereof, the element has formed therein three voids 155a, 156a, and 157a.

Figure 8:
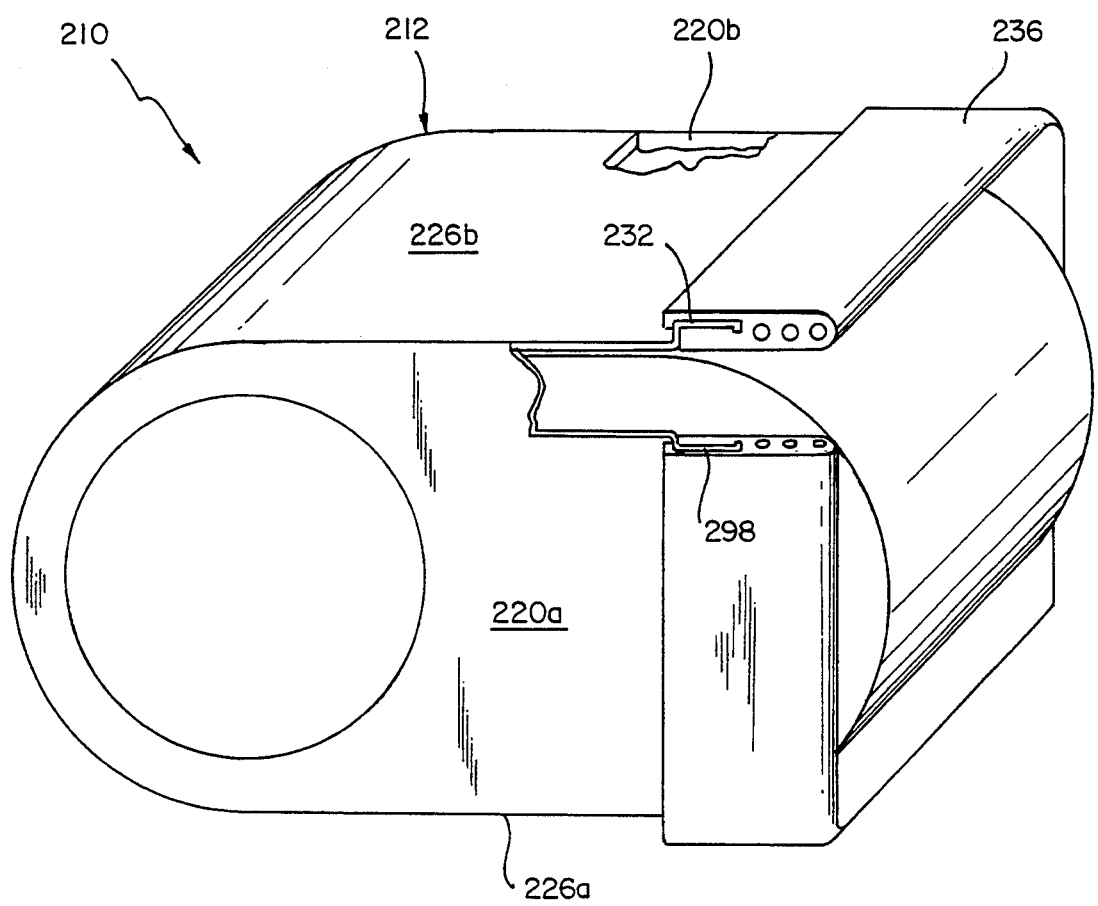
FIG. 8 is a simplified, fragmentary perspective side view of an air bag module, similar to FIG. 6, but having a reaction canister in accordance with another embodiment of the invention.

FIG. 8 illustrates an air bag module 210 having a reaction canister 212 having opposed side walls 226a and 226b and opposed end plate walls 220a and 220b wherein a resilient impact energy absorbing element 236 of one piece construction is joined adjacent the side wall edges 232 and the end plate wall edges 298.

Such a one piece construction can preferably be fabricated using extrusion or injection molding processing. In choosing between extrusion and injection molding processing, the geometry of the item to be processed is often an important consideration. In general, extrusion processing is well suited for the processing of items having constant cross sectional shape and dimensions. Whereas, injection molding processing can advantageously find application where the item to be processed is of irregular or varying cross sectional shape or dimension.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In an automotive air bag reaction canister comprising at least one side wall having an edge, said canister forming a housing for at least an inflator and an air bag chute for use in housing a stored air bag and guiding the air bag upon deployment, and being adapted for installation behind, and adjacent to, an automotive panel, the improvement which comprises:
   a first resilient, impact energy absorbing element joined to and extending adjacent the edge of said side wall whereby said element is deformable upon impact by forced displacement of said panel to absorb impact energy transmitted thereto, said element being sufficiently resilient to absorb at least 5 millimeters of linear displacement with said element comprising a smooth surface adjacent the air bag upon deployment.

2. The improvement of claim 1 wherein said first resilient, impact energy absorbing element comprises a homogeneous material.

3. The improvement of claim 2 wherein said element includes at least one void.

4. The improvement of claim 1 wherein said first resilient, impact energy absorbing element comprises an outer body of a first material.

5. The improvement of claim 4 wherein said first resilient, impact energy absorbing element additionally comprises an inner body of a second material wherein in a cross section of said first resilient, impact energy absorbing element, said outer body is in surrounding relationship with said inner body, the impact energy absorbing capacity of said second material being greater than the impact energy absorbing capacity of said first material.

6. The improvement of claim 5 wherein said second material comprises a foam material.

7. The improvement of claim 1 wherein said first resilient, impact energy absorbing element comprises first and second walls with at least said first wall comprising an extension of said air bag chute, said first and second walls being joined together by means of at least one truss member, said truss member joining a midpoint of said first wall with a midpoint of said second wall and forming at least one hollow in said element to enhance the energy absorption capacity thereof.

8. The improvement of claim 1 wherein said reaction canister comprises first and second side walls each having an edge wherein said first resilient, impact energy absorbing element is joined to and extending adjacent the edge of at least one of said first and second side walls.

9. The improvement of claim 8 wherein said first resilient, impact energy absorbing element is joined to and extending adjacent the edge of said first side wall and a second resilient, impact energy absorbing element is joined to and extending adjacent the edge of said second side wall.

10. The improvement of claim 1 wherein said reaction canister comprises a) first and second opposed side walls each having an edge and b) first and second opposed end plates each mounted to a respective end of said side walls, each of said end plates having an edge, said reaction canister additionally having
   a resilient, impact energy absorbing element joined to and extending adjacent the edge of at least one of said first and second end plates.

11. The improvement of claim 10 wherein a resilient, impact energy absorbing element is joined to and extending adjacent the edge of said first end plate and another resilient, impact energy absorbing element is joined to and extending adjacent the edge of said second end plate.

12. The improvement of claim 11 wherein said first resilient, impact energy absorbing element is joined to and extending adjacent the edge of said first side wall and a second resilient, impact energy absorbing element is joined to and extending adjacent the edge of said second side wall.

13. The improvement of claim 10 wherein a one piece construction resilient impact energy absorbing element is joined to and extending adjacent the edge of each of said first and second side walls and said first and second end plates.

14. The improvement of claim 1 wherein said first resilient, impact energy absorbing element includes a male form attachment insert and said edge of said side wall includes a corresponding female form connecting sleeve whereby joinder of said first resilient, impact energy absorbing element with said side wall comprises insertion of said male form attachment insert in said corresponding female form connecting sleeve.

15. The improvement of claim 1 wherein said first resilient, impact energy absorbing element is formed of at least one elastomeric material.

16. The improvement of claim 1 wherein said first resilient, impact energy absorbing element is formed of at least one thermoplastic material.

17. In an automotive air bag reaction canister comprising a trough-shaped body part having first and second side walls each having an edge and an end plate mounted to each end of the side walls to form a housing for at least an inflator, with the side walls and end plates also forming an air bag chute for housing a stored air bag and guiding the air bag upon deployment, the canister being adapted for installation behind, and adjacent to, an automotive panel in the head impact region thereof, the improvement which comprises:

a first resilient, impact energy absorbing element joined to and extending adjacent said edge of at least one of said first and second side walls whereby said element is deformable upon impact by forced displacement of said panel to absorb impact energy transmitted thereto, said element being sufficiently resilient to absorb at least 5 millimeters of linear displacement with said element comprising a smooth surface adjacent the air bag upon deployment.

18. The improvement of claim 17 wherein said first resilient, impact energy absorbing element is joined to and extending adjacent said edge of said first side wall, the improvement additionally comprising a second element formed of resilient, impact energy absorbing material joined to and extending adjacent said edge of said second side wall.

19. The improvement of claim 17 wherein each of said end plates has a first edge, said reaction canister additionally having a resilient, impact energy absorbing element joined to and extending adjacent the first edge of at least one of said end plates.

20. The improvement of claim 17 wherein said first resilient, impact energy absorbing element comprises and extension of said air bag chute formed by said reaction canister.

21. In an automotive air bag reaction canister comprising an extruded fabricated trough-shaped body part having first and second side walls each having an edge and an end plate mounted to each end of the side walls to form a housing for at least an air bag inflator, with the side walls and end plates also forming an air bag chute for housing a stored air bag and guiding the air bag upon deployment, the canister being adapted for installation behind, and adjacent an automotive panel in the head impact region thereof, the improvement which comprises:

an element formed of resilient, impact energy absorbing material joined to and extending adjacent to the edge of the first side wall whereby impact energy resulting from a low speed frontal collision of the automotive vehicle and imparted to the automotive panel in the head impact region is absorbed, said element comprising first and second walls with at least said first wall comprising an extension of said air bag chute, said first and second walls being joined together by means of at least one truss member, said truss member joining a midpoint of said first wall with a midpoint of said second wall and forming at least one hollow in said element to enhance the energy absorption capacity thereof, said element being sufficiently resilient to absorb at least 5 millimeters of linear displacement with said element comprising a smooth surface adjacent the air bag upon deployment.

* * * * *

UNITED STATES PATENT AND TRADEMARK OFFICE
CERTIFICATE OF CORRECTION

PATENT NO. : 5,395,133
DATED : March 7, 1995
INVENTOR(S) : Lauritzen et al.

It is certified that error appears in the above-indentified patent and that said Letters Patent is hereby corrected as shown below:

At column 10, line 9, "and extension of" should be

--an extension of--.

Signed and Sealed this

Twenty-first Day of May, 1996

Attest:

BRUCE LEHMAN

*Attesting Officer*     *Commissioner of Patents and Trademarks*